United States Patent
Mintz et al.

(10) Patent No.: US 11,076,120 B1
(45) Date of Patent: Jul. 27, 2021

(54) METHOD AND SYSTEM FOR SYNCHRONIZATION OF CONTROLLER MOVEMENTS

(71) Applicant: Swaybox Studios, Inc., New Orleans, LA (US)

(72) Inventors: Arthur Mintz, New Orleans, LA (US); Theresa Andersson Mintz, New Orleans, LA (US); Christopher Armand, New Orleans, LA (US); Noah Scruggs, Metairie, LA (US)

(73) Assignee: Swaybox Studios, Inc., New Orleans, LA (US)

(*) Notice: Subject to any disclaimer, the term of this patent is extended or adjusted under 35 U.S.C. 154(b) by 0 days.

(21) Appl. No.: 16/802,843

(22) Filed: Feb. 27, 2020

Related U.S. Application Data

(63) Continuation-in-part of application No. 16/178,658, filed on Nov. 2, 2018, now abandoned, which is a continuation of application No. 15/614,645, filed on Jun. 6, 2017, now Pat. No. 10,148,904.

(60) Provisional application No. 62/811,425, filed on Feb. 27, 2019.

(51) Int. Cl.
*G11B 27/031* (2006.01)
*H04N 5/7826* (2006.01)
*G11B 27/10* (2006.01)
*H04N 9/82* (2006.01)

(52) U.S. Cl.
CPC ....... *H04N 5/78266* (2013.01); *G11B 27/105* (2013.01); *H04N 9/8227* (2013.01)

(58) Field of Classification Search
None
See application file for complete search history.

(56) References Cited

U.S. PATENT DOCUMENTS

| | | | | |
|---|---|---|---|---|
| 2002/0191109 A1* | 12/2002 | Kriegman | ............... | H04N 9/75 348/587 |
| 2013/0007636 A1* | 1/2013 | Boss | .................... | G06F 3/011 715/757 |
| 2014/0298975 A1* | 10/2014 | Clark | .................. | G10H 1/0025 84/626 |
| 2016/0045834 A1* | 2/2016 | Burns | .................... | A63H 3/28 446/268 |

* cited by examiner

*Primary Examiner* — Eileen M Adams
(74) *Attorney, Agent, or Firm* — Bechen PLLC; Timothy J. Bechen

(57) ABSTRACT

The present invention provides a method and system for synchronization of movements of an object having multiple elements within a scene. The method and system includes generating an audio broadcast with multiple audio tracks, each track indicating movement instructions for associated elements. The method and system includes distributing the audio broadcast to a plurality of users controlling object elements. The method and system includes recording the scene with the users controlling the elements of the object based on the audio tracks, synchronizing coordination of movement instructions of the disparate but related elements of the object.

20 Claims, 11 Drawing Sheets

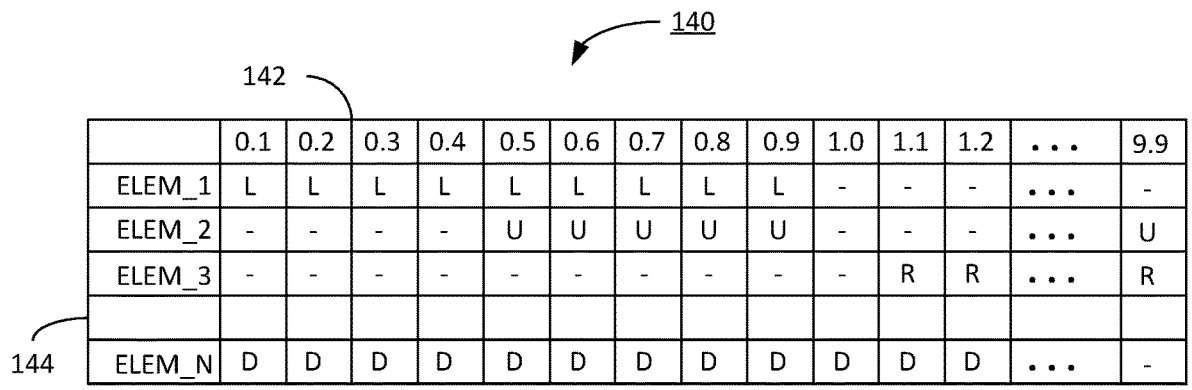
FIG. 10
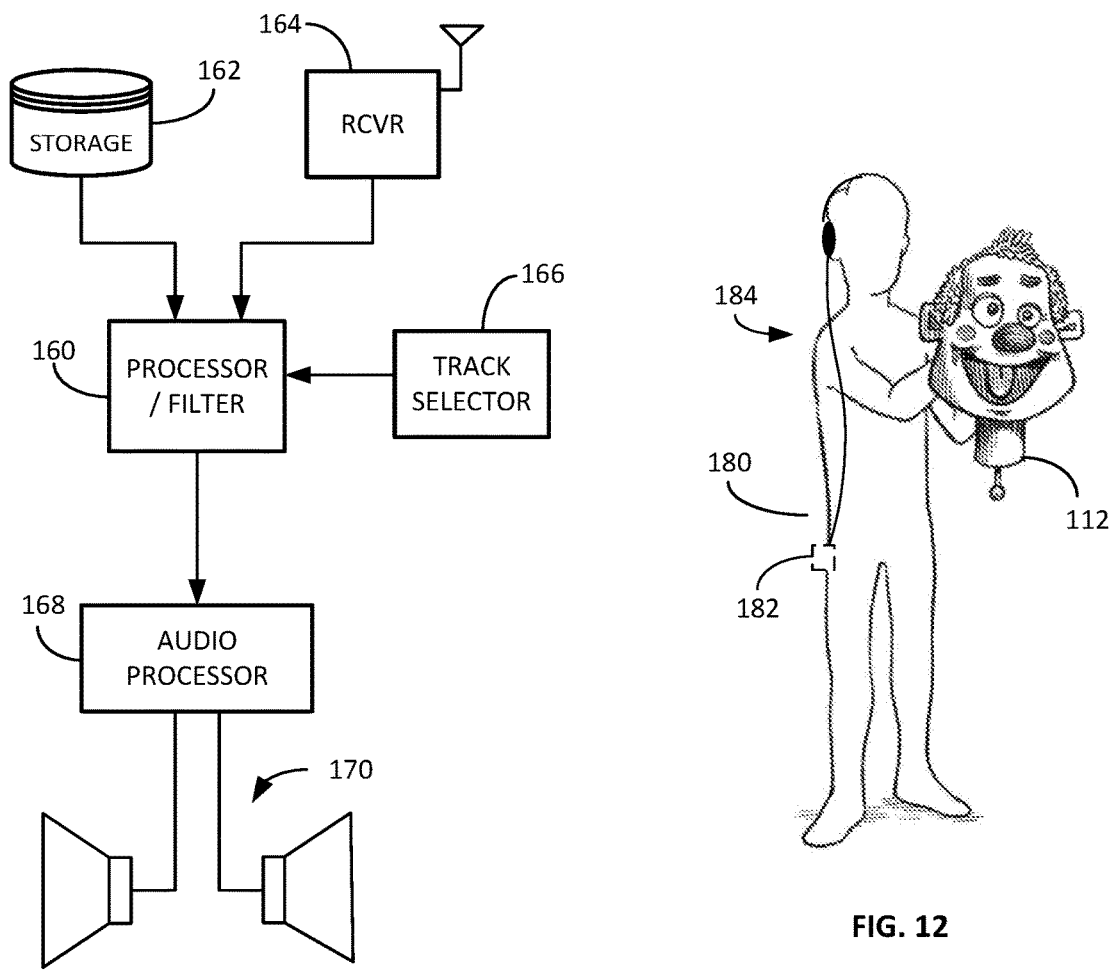
FIG. 11
FIG. 12

METHOD AND SYSTEM FOR SYNCHRONIZATION OF CONTROLLER MOVEMENTS

RELATED APPLICATIONS

The present application is a Continuation-in-part of, and claims priority to, U.S. patent application Ser. No. 16/178,658 entitled "MULTI-TRACK PUPPETRY" filed Nov. 2, 2018, which is a continuation of, and claims priority to, U.S. Pat. No. 10,148,904 entitled "MULTI-TRACK PUPPETRY" filed Jun. 6, 2017.

The present application relates to and claims priority to U.S. Provisional Patent App. No. 62/811,425 entitled "SYSTEM AND METHOD FOR SYNCHRONIZATION OF CONTROLLER MOVEMENTS" filed Feb. 27, 2019.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The disclosed technology relates generally to synchronizing puppeteer movements and more specifically to creating a soundtrack for instructing said movements.

BACKGROUND

There are many limitations for recording scenes using puppets. Synchronization of movements is paramount. The multiple moving parts can include arms, hands, feet, faces, and etc. Movements tell a story, whether performed for a live audience or captured for video recording.

Bunraku is a common example of puppeteering. For experienced presentations, these puppeteers move the different elements in a controlled sequence for visual storytelling. Preparation can take years of practice.

For example, in a scene a puppet opens and reads a scroll. This complex movement can include a right puppet hand holding the scroll, the left hand pulling to unfurl the scroll. As the left hand moves, the puppet shoulders move, the head moves, the torso may rotate slightly, etc. Then, as the puppet reads, the head rotates slightly to visualize reading. As the head rotates, the shoulders may twist. The puppet then further extends the scroll to continue reading, again reaching the left hand across to grab and further unfurl the roll.

For generating a visually appealing and accurate presentation, the puppet may be controlled by three puppeteers working in silence. Outside of rote practice, there is no known technique for perfecting the fluidity and synchronicity of these counter-rhythms.

Further complications arise with additional presentation factors, such as multiple puppets, sounds, props, etc. For example, suppose a scene involves a puppet walking across the stage. There are the basic movement sequences, e.g. raise left leg, rotate hips slightly, bend and move left leg forward, rotate torso slightly, shifter shoulders, move arms, straighten left leg, etc. Here, a foot fall creates a sound to be synchronized with the foot landing, further complicating the precision of the puppeteering.

As such, there exists a need for a technical solution for synchronicity of user(s) controlling multiple moving elements of a puppet or other visual object as part of a scene or presentation.

BRIEF DESCRIPTION

The present invention provides a method and system for synchronization of movements of an object having multiple elements within a scene. A scene is one or more sequence of movements, such as a single camera shot/capture of movement for a movie or a group of movements for a play or presentation, by way of example. An object can be, for example, a puppet, with different elements, for example, arms, legs, head, torso. An object can also be external elements associated with the scene.

The method and system includes generating an audio broadcast. The audio broadcast can include multiple audio tracks, each track indicating movement instructions for associated element of the object within the scene. The method and system includes distributing the audio broadcast, whereby a first user hears a first audio track associated with a first object, a second user hears a second audio track associated with a second object, and so on.

The audio track includes sounds recognized by the users for controlling movements, such as a high pitch click indicating upward movement of an object, a low pitch click indicating downward movement, etc. The audio tracks, with the sounds contained therein, provide the movement instructions for the users controlling movements of objects.

The method and system includes recording, via an image capture device, a take of the scene with the users controlling the elements of the object based on the audio tracks. Thereby, each user individually listening to the audio tracks provides synchronized coordination of movement instructions of the disparate but related elements of the object.

The method and system may further include affixing tracking markers to the elements during scene captures. Therein, the method and system includes electronically processing a take of the scene and integrating different elements based the tracking markers.

In addition, one embodiment of the method and system includes determining movement patterns for the objects to generate the audio tracks. For example, movement patterns can be determined using reference movements and electronically processing the reference movement to generate the movement pattern.

The method and system also facilitates synchronized movement for filming. Synchronized movements allows for element-specific filming, such as in a greenscreen environment. Because the movements are synchronized using the audio tracks, different scene captures of different elements can then be readily integrated using post-processing techniques.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIG. 10 illustrates a graphical representation one embodiment of the movement blueprint for multiple elements;

FIG. 11 illustrates one embodiment of an audio track receiver and playing device for a user;

FIG. 12 illustrates a puppeteer controlling a puppet element listening to an audio track;

DETAILED DESCRIPTION

Embodiments of the disclosed technology provide for synchronizing puppeteers in coordinated movements.

The present invention also relates to filmed performances of puppetry, with puppeteers moving portions of their character in real time. Multi Track puppetry allows a puppeteer or group of puppeteers to perform different components/portions (body parts or "pieces") of a character/creature separately and at a different time. The computer then puts the various recorded pieces together to create a seamless and unified performance. As just one example, a scene in which a character walks across the street and waves could be performed as a composite of partial scenes as follows: a first puppeteer is recorded performing a scene puppeting only the body and legs of the character; then the same or a second puppeteer is recorded performing the scene puppeting only the left arm of the character; then the same first or second or a third puppeteer is recorded performing the scene puppeting only the right arm of the character; then the same first. Second, or third or a fourth puppeteer is recorded performing the scene puppeting only the head of the character. The recordings of the scenes of the various body parts are then compiled via a computer to create one scene with the whole body of the character. This allows for asynchronous recordings of various portions (including of different scales) of a single bodied character to be combined to form an illusion of a single live recorded character.

The disclosed invention further relates to methods and puppet character kits comprising a first portion of the puppet character, a second portion of the puppet character disconnected from the first portion, and a tracking marker on one of the first portion of the puppet character and the second portion of the puppet character adjacent to a connection location between the first portion and the second portion. According to a further embodiment, the first portion of the puppet character is of a different scale than the second portion of the puppet character. The recording tracks maybe analog or digital and may be made on exposure film, flash memory, hard drive, for example, including other electronic manners of capturing video.

Figure 1:
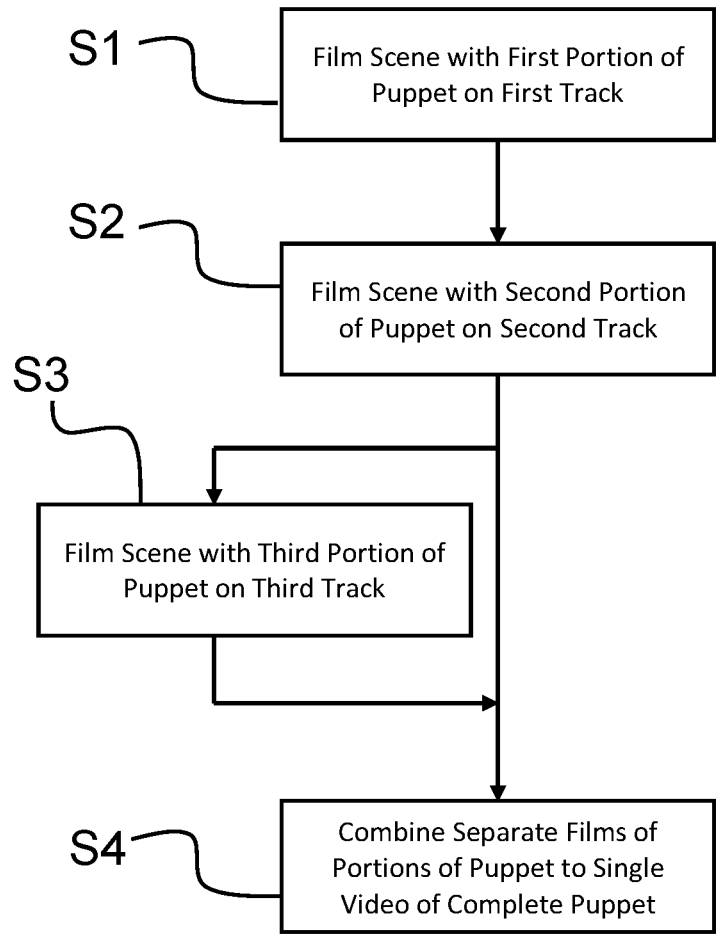
FIG. 1 a flowchart of one embodiment of filming a puppet scene with multiple takes.

Turning now to FIG. 1, a brief description concerning the various components of the present invention will now be briefly discussed. The present invention is related to methods and devices for creating a video 2 of a puppet character 4 comprising a first step S1 of filming a scene 6 of at least a first portion 8 of the puppet character 4 on a first video recording track 10, a second step S2 of filming the same scene 6 including a second portion 12 of the puppet character 4 on a second video recording track 14, preferably a third step S3 of filming the same scene 6 with a third portion 16 of the puppet character 4 on a third video recording track 16, and a fourth step S4 of combining the first video recording track 10 of the first portion 8 of the puppet character 4, the second video recording track 14 of the second portion 12 of the puppet character 4, and preferably the third video recording track 18 of the third portion 16 of the puppet character 4 together onto a single video recording 2 of the scene 6 with an assembled puppet character 4. The video 2 produced can be a single scene 6 or a compilation of multiple sequential scenes 6 lasting one or more seconds long, one or more minutes long, or one or more hours long, as desired, including feature length movies.

Figure 2:
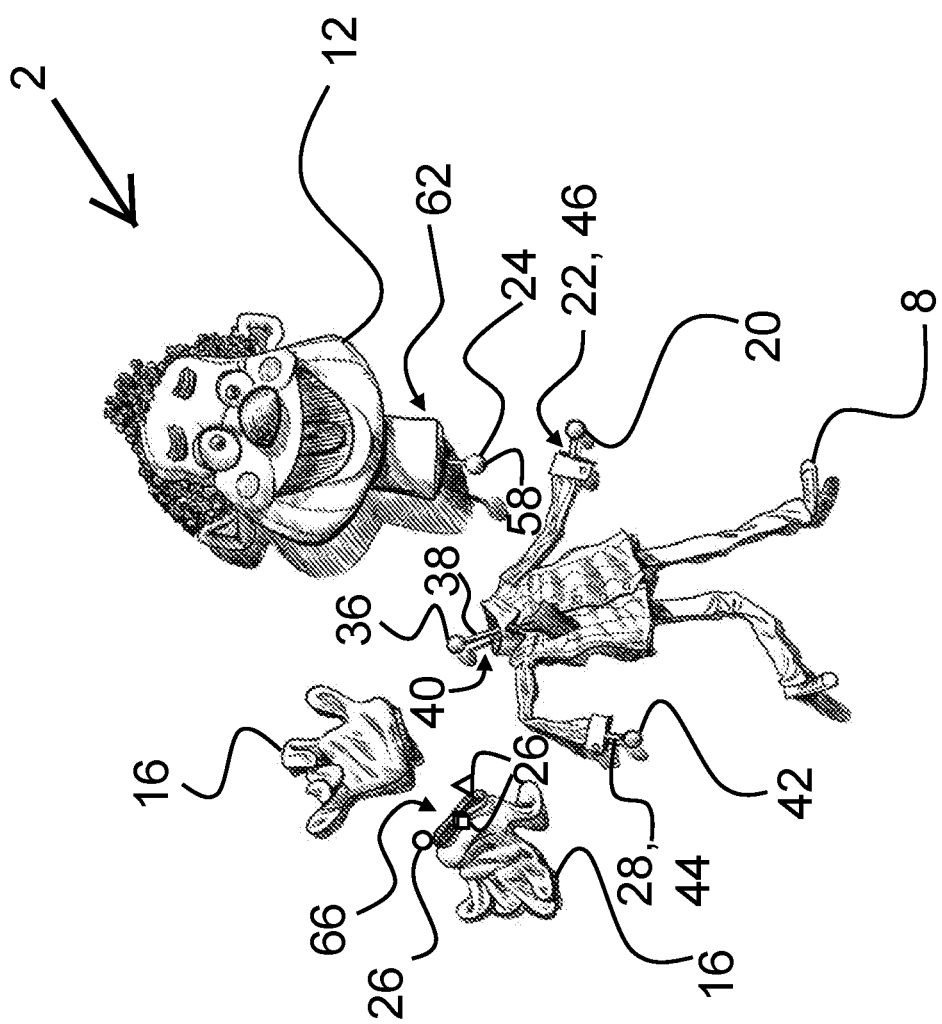
FIG. 2 is a top plan view of a puppet character divided into multiple parts or portions.

Turning to FIG. 2, as can be seen in this embodiment, the puppet character 4 has been split into multiple portions 8, 12, 16. In this embodiment, the first portion 8 of the puppet character 4 is the headless and handless torso, arms, legs and feet. The second portion 12 of the puppet character 4 is the head. The third portion 16 of the puppet character 4 is the two hands. It is to be noted that the third portion is optional, and that further fourth, fifth, sixths, seventh, and further portions and associated filming steps may also be provided.

In this embodiment, the three portions 8, 12, 16 are of different scales. The first portion 8 is about 1:4 scale, or about one fourth the scale of the size the puppet character 4 is depicted as being in the final video 2. The second portion 12 is about 2:1 scale. The third portion 16 is about 3:2 scale. In an alternative embodiment, the different portions 8, 12, 16 of the puppet character 4 may all be of the same scale. In a further alternative embodiment, two, three, four or more of the portions 8, 12, 16 may be of the same scale while one, two, three, four, or more other portion(s) 8, 12, 16 may be of different scale(s).

Each portion 8, 12, 16 preferably has a tracking marker 20 adjacent to a connection location 22. The connection locations 22 are a physical location on a given portion 8, 12, 16 where another portion 8, 12, 16 would connect to the given portion 8, 12, 16 when the puppet character 4 is assembled. The tracking markers 20 may be three dimensional shapes, such as spheres (as shown), cubes, or pyramids, for example. They may also be two dimensional shapes like circles, regular polygons, crosses or unique shapes. Though each portion 8, 12, 16 preferably has a tracking marker 20 adjacent to a connection location 22, the invention may also function with a tracking marker 20 on only one connection location for two complementary connection location 22 or mating portions of puppet characters—such as a hand and a wrist or a head and neck for example.

The tracking markers 20 may be mounted tracking markers 24 as shown or surface tracking markers 26, for example. Mounted tracking markers 24 may be two or three dimensional, and are mounted on extensions 28 that preferably extend away from the puppet portion 8, 12, 16. The extensions 28 may be rods or dowels that are preferably mounted internally in the puppet portion 8, 12, 16 and preferably extend through a central area of the connection location 22. Alternatively or additionally, surface tracking markers 26 may be used, which may be applied on the surface of the puppet character portion 8, 12, 16, especially those portions 8, 12, 16 like the gloves in FIG. 4, that are meant to be worn when puppeted. The surface tracking markers 26 may be two dimensional or three dimensional, and are preferably applied in the proximity or directly adjacent to the connection location 22. Multiple surface tracking markers 26 may be used around a perimeter of the connection location 22 to aid in tracking. Additionally, different shaped, sized, or colored tracking markers 20 may be used for different puppet portions 8, 12, 16, or different connection locations 22 on a same puppet portion 8, 12, 16. Additionally, different shaped, sized, or colored tracking markers 20 may be used around a perimeter of a same connection location 22, to aid in three dimensionally orienting the puppet portion 8, 12, 16 during filming.

The various portions of the puppet character's body parts are puppeted, preferably having appropriate tracking markers. The tracking marker is any marker the computer can easily identify for the purpose of marking the connection point of the various components. Examples of tracking markers include small colored sticker, ping pall ball painted certain color, colored plastic pyramids and a wooden stick with a colored dot on it. Some examples of the color are green and hot pink, though other colors could be used, including markers painted with non-visible light wave reflective coverings, such as UV reflective, infrared reflective, microwave reflective, and radio wave reflective coverings. The shape and or the color of the tracking marker should stand out in most or all lighting and be a color and or shape that is easily trackable.

Figure 3:
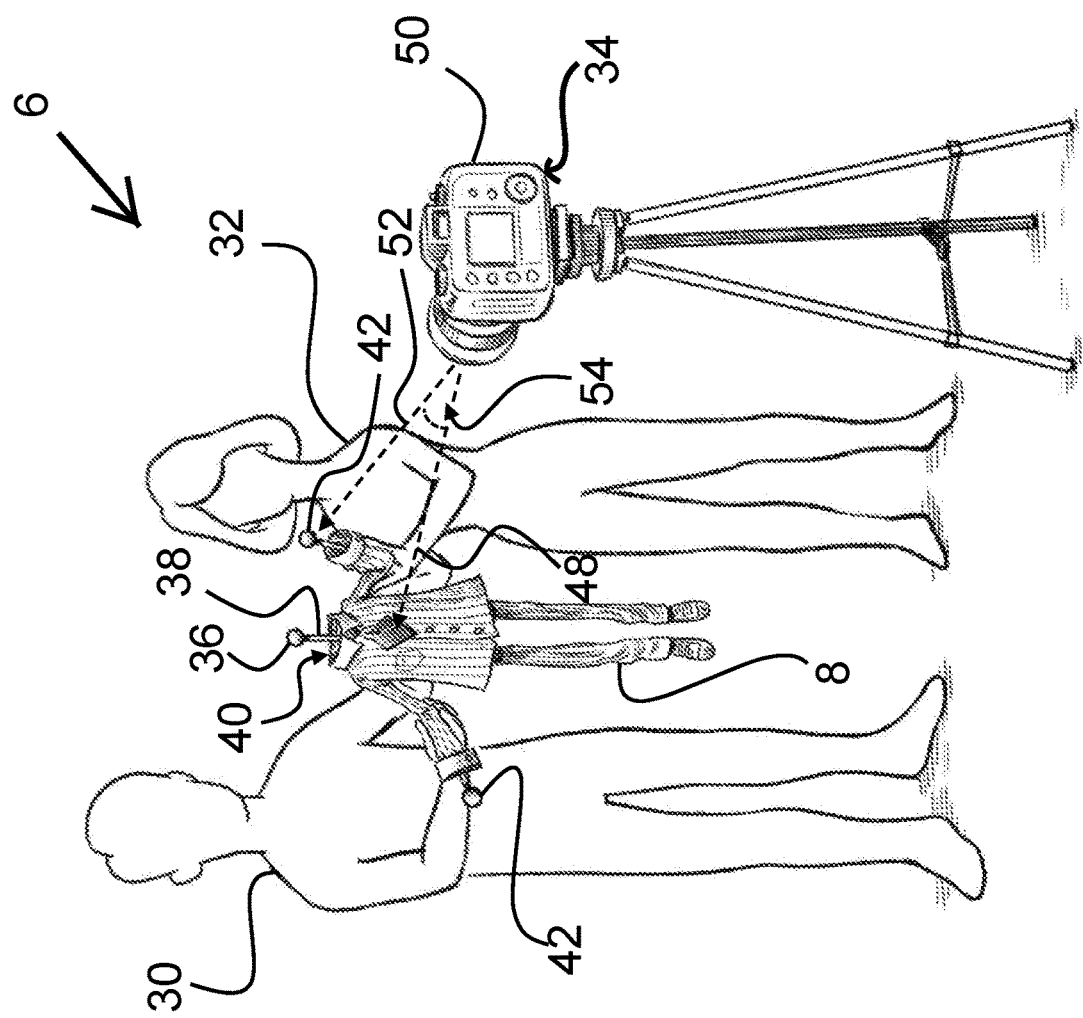
FIG. 3 is a perspective view of a first and a second puppeteer recording a scene with a first portion of the puppet character of FIG. 2.

Turning to FIG. 3-7, an exemplary embodiment of the disclosed multi-track puppeting device and method is shown. In FIG. 3, a first filming step S1 is shown. In this step first and a second puppeteer 30, 32 are shown filming a scene 6 with the first portion 8 of the puppet character 4 on a first recording track 34. This first portion 8 is the torso, arms, legs and feet of the puppet character 4. A first tracking marker 36 is mounted on a first tracking marker extension 38, which is connected to the interior of the first portion 8 of the puppet character 4 and extends through a central area of a primary first connection location 40. The primary first connection location 40 is where the first portion 8 of the puppet character 4 connects to the second portion 12 of the puppet character 4 when the puppet character 4 is assembled in the final video 2. The primary first connection location 40 in the embodiment shown is proximate to where the neck of the puppet character 4 would be. Second tracking markers 42 are mounted on second tracking marker extensions 44, which are connected to the interior of the puppet character 4 and extend through a central area of secondary first connection locations 46. The two secondary first connection locations 46 shown are where the first portion 8 of the puppet character 4 connects to the two third portions 16 of the puppet character 4. The secondary first connection locations 46 in the embodiment shown is proximate to the wrists of the puppet character 4, or where the forearms would connect to the hands. In the embodiment shown, the first portion 8 has three connection locations 22, one primary first connection location 40 and two secondary first connection locations 46, with each connection location 40, 46 having a mounted tracking marker 24. In other embodiments, some or all of the connection locations 22 could have surface tracking markers 26, or no tracking markers.

The scene is preferably filmed in front of a chroma key green screen and the first and the second puppeteers 30, 32 are preferably dressed in a green screen suit or other clothing to allow the background and the two puppeteers 30, 32 to be easily removed or edited out the final video in the combining step. It is understood that various colored or types of chroma key type backgrounds and suit may be used as is appropriate. Additionally or alternatively, the scene 6 may be filmed in front of a background to be used in the video, or for example, a filmed background may be combined in the combining step S4.

As shown, the puppeteers 30, 32, while filming the scene 6, preferably remain cognizant of the first portion 8 of the puppet character's 4 location with respect to a central recording axis 48 of the filming camera 50, and of the locations of the primary and secondary first connection locations 40, 46 with respect to the central recording axis 48. The central recording axis 48 is an imaginary line formed by a straight ahead axial view from a center of the lens for the filming camera 50. Also shown is a connection location vector 52 formed by an imaginary line extending from a connection location 22 to the center of the lens for the filming camera 50. The connection location vector 52 shown in FIG. 3 is for the secondary first connection location 46 proximate to the left wrist of the puppet character 4. A connection angle 54 is formed by the angle between the central recording axis 48 and the connection location vector 52, preferably including both the magnitude and direction of the angle from the central recording axis 48. By substantially maintaining a same connection angle 54 for complimentary connection locations 22 between respective filmings S1, S2, S3 of a same scene 6 with different portions 8, 12, 16 of the puppet character 4, visual perspective agreement is maintained for the different portions 8, 12, 16 of the puppet character about the connection locations 22 when the final video 2 is combined, enchaining the realism of the assembled puppet character 6 in the video 2.

Figure 4:
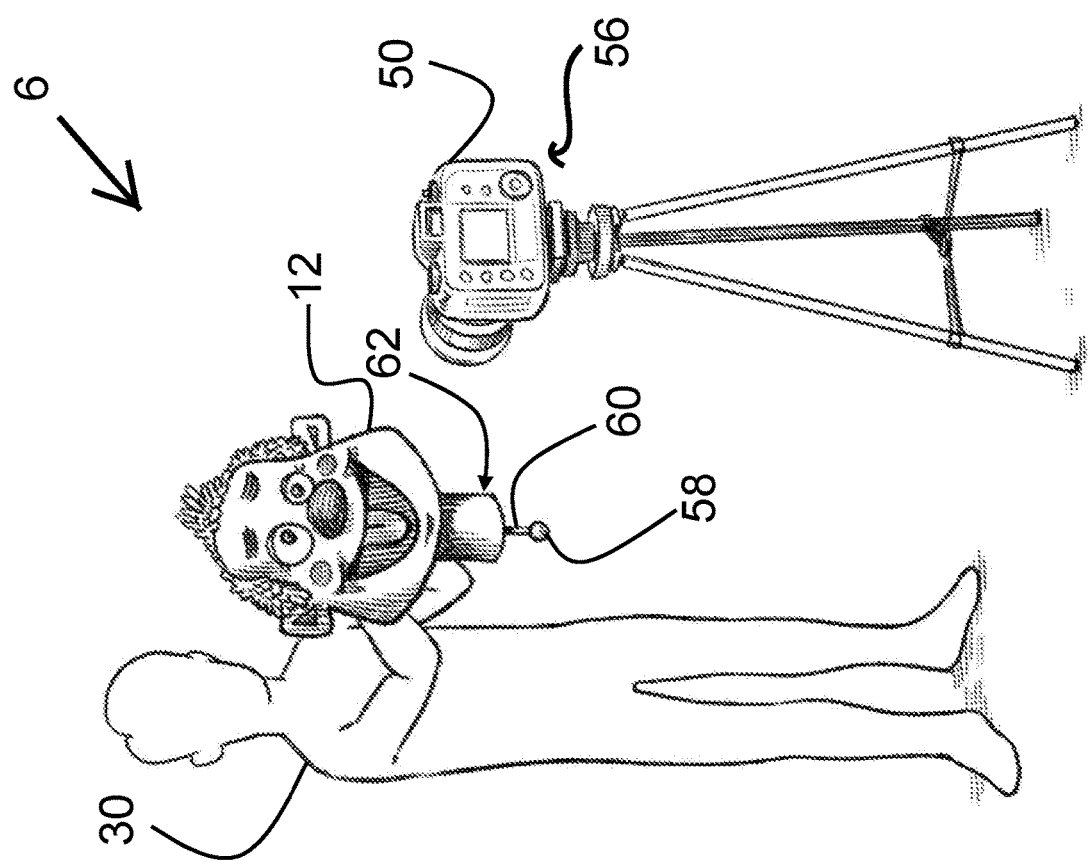
FIG. 4 is a perspective view of the first puppeteer from FIG. 3 recording the same scene of FIG. 3, but with a second portion of the puppet character of FIG. 2.

Turning to FIG. 4, a second filming step S2 is shown. In this step the first puppeteer 30 is shown filming the same scene 6 as in FIG. 3, but with the second portion 12 of the puppet character 4 on a second recording track 56. The second portion 12 in the embodiment shown is the head and neck of the puppet character 4. A third tracking marker 58 is mounted on a third tracking marker extension 60, which is connected to the interior of the second portion 12 of the puppet character 4 and extends from a central area of a second connection location 62. The primary first connection location 40 is where the first portion 8 of the puppet character 4 connects to the second portion 12 of the puppet character 4. The second connection location 62 in the embodiment shown is proximate to the neck of the puppet character 4.

Figure 5:
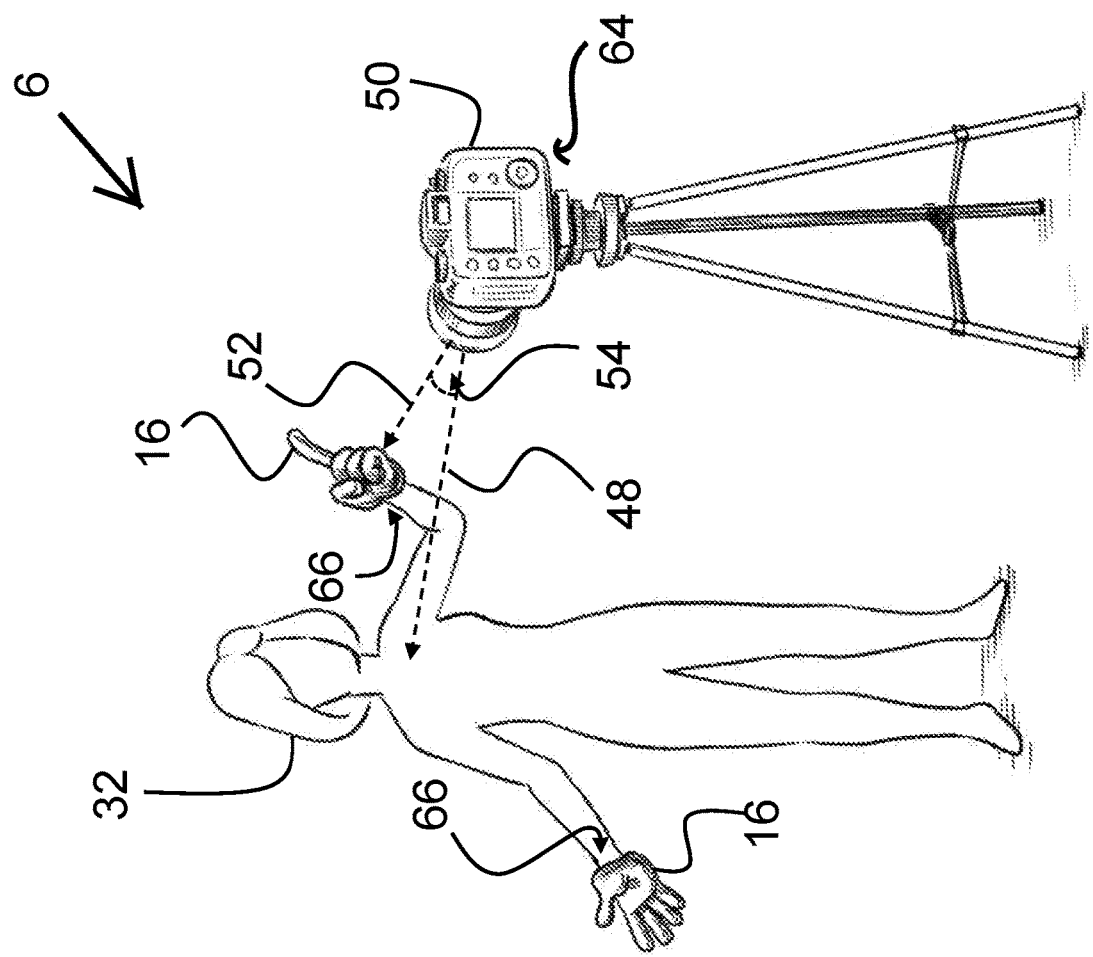
FIG. 5 is a perspective view of the second puppeteer from FIG. 3 recording the same scene of FIG. 3, but with a third portion of the puppet character of FIG. 2.

Turning to FIG. 5, a third filming step S3 is shown. In this step the second puppeteer 32 is shown filming the same scene 6 as in FIGS. 3 and 4, but in this step the filming is with the third portion 16 of the puppet character 4 on a third recording track 64. The third portion 16 in the embodiment shown is the right and the left hands of the puppet character 4. In this embodiment, no tracking marker 20 is mounted on either of the third portions 16, including at third connection locations 66. The third connection location 66 is where the first portion 8 of the puppet character 4 connects to the third portion 16 of the puppet character 4. The third connection location 66 in the embodiment shown is proximate to the wrists of the puppet character 4.

Figure 6:
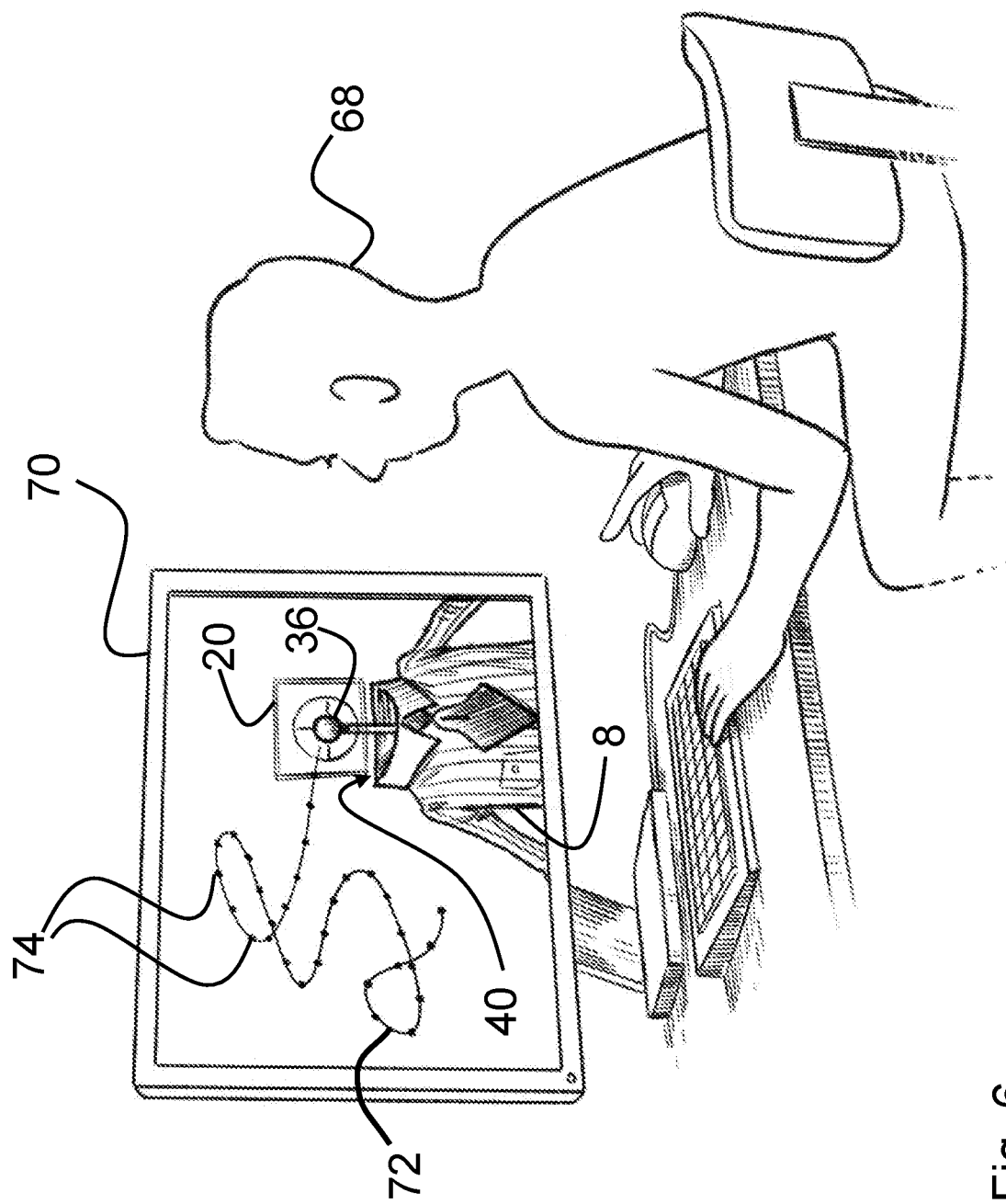
FIG. 6 is a perspective view of an animator combining the recordings from FIGS. 3-5.
Figure 7:
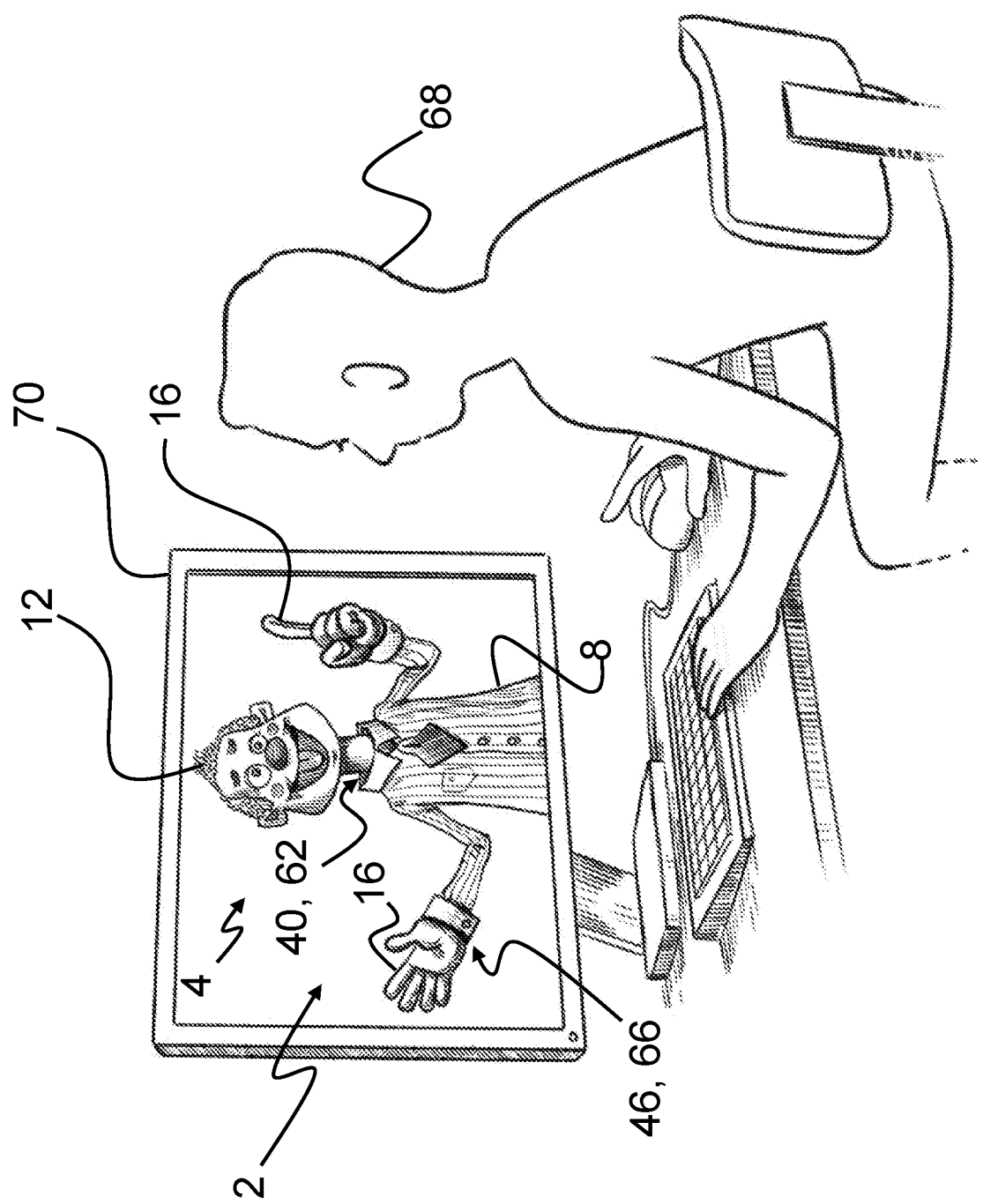
FIG. 7 is a combined video of the recordings from FIGS. 3-5

Turning to FIG. 6, a fourth combining step S4, and in FIG. 7, the resulting completed puppet character video, is shown. In the fourth combining step S4 an artist 68 or operator combines the first video recording track 10 of the first portion 8 of the puppet character 4, the second video recording track 14 of the second portion 12 of the puppet character 4, and the third video recording track 18 of the third portion 16 of the puppet character 4 together onto a single video recording 2 of the scene 6 with an assembled puppet character 4 (shown in FIG. 7). Using the tracking information captured in the various video recording tracks 10, 14, 18 and a personal computer 70, for example, running visual effects software, the artist attaches the different portions 8, 12, 16 of the puppet characters 4 body parts back together. Some examples of visual effects software with a tracking tool include Astra Effects™, PS Track™, and NUKE™.

In this step S4, in each video recording track 10, 14, 18 the background and puppeteers 30, 32 are extracted or cropped out of the video recording tracks 10, 14, 18 to leave the respective portions 8, 12 16 on the respective video recording tracks 10, 14, 18. The computer 70 then creates a 4D track 72 with frame nodes 74 that correspond to the location of a given tracking marker 20 on each frame of video for a given time period. The thirty-one frame nodes shown in FIG. 6 could represent just over one second of filming, for a 24 frame per second rate of filming. The movement of the portions 8, 12, 16, frame by frame, when properly aligned, gives the impression of smooth and natural movement in the finished video 2. The artist 68 confirms that the 4D track 72 created by the computer 70 is correct, and the artist 68 can edit the location of the frame nodes 74 to align with the true locations tracking markers 20 on each frame. This is referred to as getting a track of the object. The preferable manner is recording a portion 8, 12, 16 that has a tracking marker 20, where the tracking marker 20 is visible all the time. This allow the computer 70 to easily recognize the tracking marker 20 and create the 4D track 72 and the artist 68 to easily confirm the 4D track 72. A more laborious alternative is to manually track a filmed scene of a portion 8, 12, 16. With manual tracking the artist 68 moves preferably frame by frame to manual track the portion 8, 12, 16, "eyeballing" where a tracking marker would be, and assigning a frame node 74 for each frame for the portion, and thereby creating—frame by frame—a 4D track 72.

The tracking marker 20 may have additional shape or size features that help the artist (or computer 70) plot or confirm the 4D track 72 of the portion 8, 12, 16. As shown in the embodiment of FIG. 6, a square frame and inscribed circle and cross may also be mounted on the tracking marker 20. This would give the artist more visual information, more means of checking if the 4D track 72 is accurate. This is another reason that preferably the tracking marker 20 is a color that stands out and is visible in darkness and light.

Then separate portions 8, 12, 16 are layer or joined together to create a whole puppet character 4 at complementary connection locations 22 by aligning the tracking markers 20 for each portion to the tracking nodes 74 on respective 4D tracks 72. A complementary connection location 22 is where two connection locations 22 join, such as the primary first connection location 40 and the second connection location 62 in the embodiment shown. There is preferably a single 4D track for each complementary connection location 22. Alternatively, separate 4D tracks may be created for each tracking marker 20, and then the artist can separately match the frame nodes 74 for the 4D tracks 72 for complementary connection locations 22. Additionally, the computer can automatically match the frame nodes 74 for the 4D tracks 72 for complementary connection locations, and the artist 68 can preferably confirm the computer's 70 matching, and edit as needed.

When a tracking marker 20 physically extends beyond the connection location 20, a connection gap may be factored into the combination step S4, whereby a frame node 74 aligning with a tracking marker will align with a frame node 74 for a complementary tracking marker 20, but will offset the second frame node 74 by a set amount in a set direction—for example the scaled distance the first tracking marker 36 extends beyond the primary first connection location 40 plus the scaled distance the third tracking marker 58 extends beyond second connection location 62, with such gap amount and direction being adjusted by the angle of the two portions 8, 12, 16 to one another.

As stated above, a tracking marker 20 is not necessary for all of the separate portions 8, 12, 16, but greatly expedites the combination step S4 if present. Preferably, at least one of two connecting portions 8, 12, 16 will have a tracking marker 20. Items like gloves, which are worn by puppeteers 30, 32, may not have tracking markers 20. In such circumstances, as described above, the artist 68 will preferably composite the portion 8, 12, 16 manually, that is, for example, will "eyeball" a center of the wrist for the glove when attaching the glove to a frame node 74 or to the wrist of the torso portion 8.

Preferably, a tracking marker 20 on is on the negative not the positive. In one embodiment, the tracking marker 20 is only put on the asset or portion 8, 12, 16 the body is being attached to. So if two body parts are being connected, one tracking marker 20 could suffice. A tracking marker 20 for each is preferable though.

As mentioned briefly above, other types of tracking markers 20 may include different type of laser or ultraviolet tracking markers 20, which are preferably visible through a puppeteer's 30, 32 skin or body, such that the camera 50 computer can "see" the tracking marker 20 no matter where the puppeteer's hand or arm is, even if the puppeteer's 30, 32 hand or arm is between the tracking marker 20 and the camera 50. In such embodiments, the tracking marker 20 may be used inside the glove or other worn portions 8, 12, 16. This will allow the camera to track the portion 8, 12, 16 so that the camera can pick up the tracking marker 20 no matter where puppeteer's 30, 32 hand is.

In further embodiments, the tracking marker 20 may reflect or emit a preferably non-visual electromagnetic signal to a detector(s), either through the camera lens, mounted on the camera, or mounted elsewhere in filming area. In one embodiment there can be three or four detectors spaced in the in or near the filming area to triangulate the location of each non-visual electromagnetic signal emitting/reflecting tracking marker 20. In this way, the separate tracking markers 20 may be tracked in three dimensions over time without impeding visually on the take. The tracking data from the separate tracking markers 20 could be compiled in the computer 70 to compute a 4D track 72 for the separate tracking markers 20.

In still further embodiments, the separate tracking markers 20 could contain preferably miniaturized microprocessors, memory, and sensors, including accelerometers and/or 3 dimensional location sensors, for example. In this embodiment, each tracking marker 20 could track and record in memory its own movement through three dimensional space and time. After the puppeteers 30, 32 record the scene 6, and the tracking marker 20 records in memory its location data, the tracking marker's 20 data could be uploaded to the computer 70 and the 4D track 72 for the separate tracking markers 20 could be computed. Additionally or alternatively to having onboard memory, the tracking markers 20 of this embodiment could have wireless transmitting functionality, such as wi-fi or blue-tooth, just for example, and as the scene 6 is being filmed, these tracking markers 20 could just transmit their respective three dimensional locations in real time to sensors or receivers of the camera 50 or additional sensors or receivers, as the scene 6 was progressing. The data would then be loaded into the computer 70 and 4D tracks 72 for the separate tracking markers 20 could be computed, and the portions 8, 12, 16 of the puppet character 4 then combined for final video 2.

The portions 8, 12, 16 may be separately adjusted in size in the computer, with magnifications greater than or less than 1.0, to attain a uniform scale for the whole puppet character 4. This is shown in FIG. 7, where the second portion 12 head of the puppet character 4, though multiple times larger than the first portion 8 torso of the puppet character 4, is resized to be an appropriate size for the first portion 8 torso.

In embodiments when the background is filmed with the portion 8, 12, 16, the puppeteers will be cropped or chroma keyed out and the respective portion and background remain 8, 12, 16, The previously described embodiments and variations of the present invention have many advantages. Some of the advantages of some embodiments include the ability to create a single unitary scaled puppet character of multiple varied scaled portions. This is advantageous if, for example, the puppet character is built to be a 1:6 scale and interact on a 1:6 scale background set, but it is desired to file the puppet character's hands moving and articulating as naturally as someone moving a hand inside of gloves. By separately filming the gloved puppet hands worn and puppeted by a puppeteer, such as in FIG. 5, and then adjusting the scale and adding them to the body, the overall puppet is allowed to be quite small, while still allowing a much higher quality puppeteering of the hands than would be possible otherwise. With the multiple scales of different portions of the puppet character, it is possible to create characters with any proportion and not limited to human armature or anatomy. As stated above, character with apparently tiny hands are possible with hands that are still articulated internally by puppeteers. This allows using and filming an optimal performance size for a given portion of the puppet character, and then rescaling the portion for the combining step and creating the video with a puppet character of unitary scale.

Additionally, by breaking the puppet character into multiple portions, very complex sequences, like a puppet character jumping of a ledge, rolling on the ground, and bouncing up to a walk, for example, become significantly easier by both allowing puppeteers to focus on only a single portion at a time and not requiring that all elements of the puppet character be correct in a single shot. Instead, the hands can be filmed until the hands puppeteer gets the shot correctly puppeted, with the hand puppeteer focusing just on the hands. Then the head can be filmed until the head puppeteer gets the shot correctly puppeted, with the head puppeteer focusing just on the head. As opposed to having 4 to 5 puppeteers manipulating a puppet character for each take, and needing to select a take which is perfect all around. This greatly enhances the separate puppeteers' ability to control the nuance of a performance, and selecting the best take of each portion of the puppet character.

Also, by splitting the puppeting into multiple separately filmed portions, it allows for a reduced number of very talented puppeteers to puppet the entire puppet character. This can be especially advantageous where there are limited numbers of highly talented puppeteers.

Compared with animation, the disclosed invention offers clear advantages in video quality and time requirements. Puppetry is live filmed video that allows high definition and high texture and granularity in appearance. Even though puppetry is a moving inanimate object, the live action film recording offers a visual realism that surpasses animation. Further, even with the embodiments of the disclosed invention using 4D track and combining multiple portions of a puppet character on multiple video recording tracks into a final whole puppet character on a single video, the process can offer significant time advantages over animation, including up to 40 times faster production. The rendering time required to make animated figure approach real life is substantial. With the filmed puppet character though, the texture, lighting, and shadow is instantaneous as soon as the scene is recorded on the camera.

Where the above multi-track solution allows for multiple takes and integration of elements, problems still arise with the timing of objects movements. Synchronized movement relies on coordination of movements for different puppeteers or object controllers. Thereby, the multi-track method and system is further enhanced by audio broadcasts with audio tracks providing auditory movement instructions.

Figure 8:
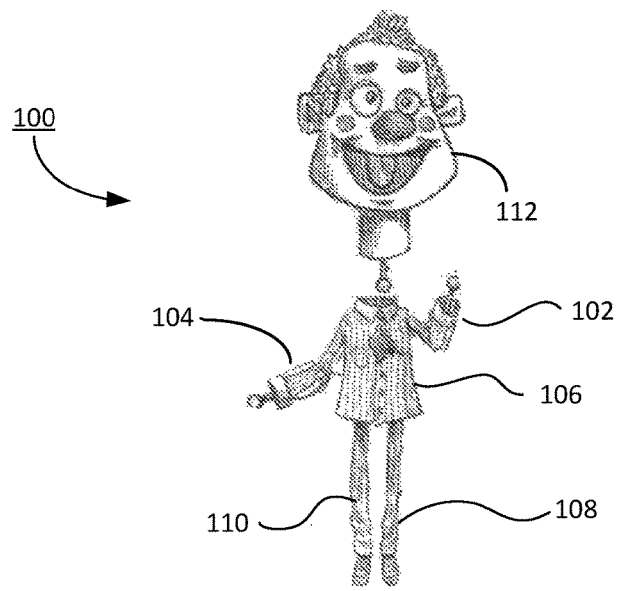
FIG. 8 illustrates a puppet with multiple elements controllable by multiple puppeteers.

FIG. 8 illustrates a representative puppet 100 including multiple elements, such as a left arm 102, right arm 104, torso 106, legs 108, 110 and head 112. In normal operations, puppeteers control movement of the puppet 100, where the puppeteer (not shown) is either minimized from view or completely extracted.

In the example of on-stage performances, the puppeteer can be dressed in all-black with a darkened stage. In the example of making a video, the puppeteer may utilize known greenscreen technology with post-processing.

With multiple elements 102-112, animating the puppet 100 requires multiple puppeteers, each moving one or more of the elements in a controlled and coordinated sequence. A first step of the invention is having a defined choreography of movements by different puppeteers, translating into puppet animation.

In one embodiment, the sequence of movements can be captured on film with one or more markers associated with the puppeteers and/or the puppet elements. In one embodiment, this sequence of movements can be tracked using computerized tracking software. Movements are translated into a blueprint.

Using the example of a puppet being animated to show walking, the animation includes movement of the arms, legs, and rotation of the torso to simulate hip movements. Thus, with reference to the puppet 100, this includes moving the left arm 102 and the right leg 110, with rotating the torso 106. As the leg 110 lands, the next step of the movement would be raising the right arm 104 and the left leg 108, with torso 106 rotation.

Figure 9:
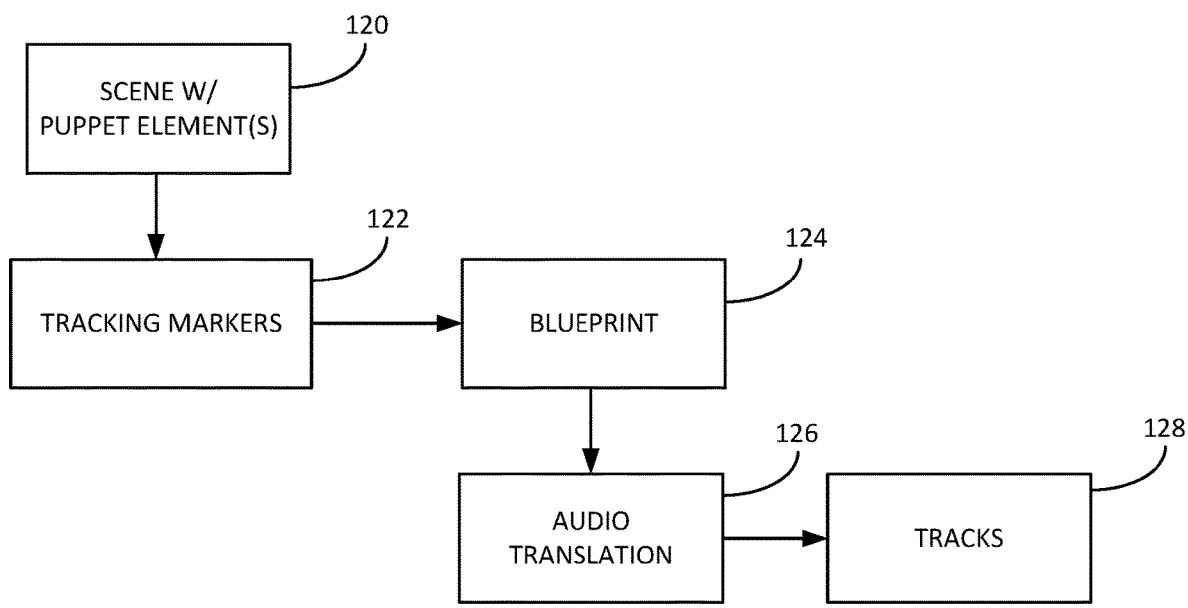
FIG. 9 illustrates one embodiment of a processing system for generating audio broadcasts.

FIG. 9 illustrates one embodiment of a system for automated track generation. The system may use one or more computer processing devices or systems, in a local or networked environment. Communication may be via local or networked connections, using known protocols.

In this embodiment, the system includes a scene 120 with puppet elements, such as elements 102-112 of FIG. 8. This scene 120 may be an image file of any suitable format. In one embodiment, the movement may be movements of the puppet elements themselves, such as multiple puppeteers moving the objects. In another embodiment, the scene may include representations of puppet movements, such as an actor imitating walking with markers located at the various objects, e.g. limbs or body sections.

Tracking markers 122 is a processing step for either detecting the tracking markers within the scene 120 or performing image processing analysis to detect and generate tracking markers from the object movements. The tracking markers 122 determine movement or changes in position of objects from a frame to frame or time to time sequence.

Movement is translated into a blueprint using processing element 124. FIG. 10 illustrates a sample blueprint 140 including a time sequence 142 and elements 144. The time sequence 142 can represent any suitable period of time, such as measured in time or frames for recording purposes, e.g. a tenth of a second, a single frame or a number of frames, etc. The elements 144 can be the elements 102-112 of FIG. 8 but can also represent puppeteer movements. As additionally noted, the elements can also be external elements, such as external sounds, lights, other puppet reactions, etc.

Sample table 140 shows 99 intervals ranging from 0.1 to 9.9, where only a handful of entries are shown. For example, this could represent 99 frames of video capture, representing approximately 4 seconds of animation. In another example, each entry could be 0.1 second, representing 9.9 seconds of animation.

In the sample table 140, the first element is designated as being moved left (L) for intervals 0.1-0.9 and stationary for intervals 1.0-1.2 and 9.9. The second element is stationary until interval 0.5 and moves upward until interval 0.9.

As illustrated, the table 140 can include N number of elements (where N is any integer value). This table 140 then represents, codified in table format, the choreography of the animation on an element-by-element basis. In this example, movements can be left (L), right (R), up (U), and down (D), but any suitable movement direction can be codified. Entries can also include movement-related information, such as pace of movement, rotation, acceleration, etc.

With reference back to FIG. 9, the blueprint generator 124 provides the blueprint (e.g. table 140 of FIG. 10) to an audio translation module 126. The module 126 converts the blueprint into audible sounds, such as clicks or other sounds that represent object movements.

For example, a leftward movement may be designated by a first click sound, e.g. a low click sound, a rightward movement can be designated by a second click sound, e.g. a high click sound, etc. Generating the clicktrack takes the entry-specific movement and inserts the corresponding click or audible instruction into the track.

This translation occurs for one or more of the elements, creating an audio score of the choreography. The module 126 generates the audio tracks 128. In one embodiment, the number of tracks correlates to the number of elements. In another embodiment, tracks may include multiple elements, such as if a puppeteer is controlling two objects, the audio track may include audio from each object, such as a first object with low sounds and a second object with high sounds, for example.

One embodiment may include clicks or similar sounds, but it is recognized that any suitable audio may be utilized and the present invention is not expressly limited to click sounds.

In further embodiments, additional choreography instructions can be translated into audio elements of the track. For example, if element movement is at a quick pace, the click may include a high pitched swoosh sound with slow movement including a bass or low undertone. In one embodiment, audio elements can provide tempo instructions to puppeteers, similar to instructions of fortissimo, allegro, largo, etc., found in sheet music.

With the formation of tracks, the method and system further includes broadcasting or distributing audio tracks to one or more users. Broadcasting can include a local broadcast technique, such as using a Bluetooth® or other wireless techniques. Broadcasting from a centralized source provides for synchronicity of users in response to the audio tracks. One exemplary technique may include broadcasting techniques similar to products available from M-AUDIO® of Cumberland, R.I., providing separate audio tracks to individual musicians while those musicians are creating a musical recording.

In one embodiment, an audio broadcast can include multiple tracks in a layered or modulated fashion. For example, the audio broadcast of the table 140 of FIG. 10 would include N different tracks, one track for each element. Similar to a frequency modulated broadcast with a radio transmission, these multiple tracks can be sent as a single transmission.

In another embodiment, the soundtrack can be locally stored with multiple users hitting play at the same time. In another embodiment, the soundtrack may be locally stored with an external start control from an application or other outside source so the audio track is played synchronously across multiple users but pulled from local sources.

By way of example, FIG. 11 illustrates one embodiment of a playing module for playing the audio track(s). This system includes a processor 160 for filtering the audio tracks. A storage device 162 stores the audio track(s), such as downloaded or wireless transmitted to the device. A broadcast receiver 164 is another exemplary embodiment for receiving audio track(s) such as being broadcast from a local transmitter (not illustrated).

In the exemplary embodiment, the audio broadcast has multiple tracks, therefore the user can select which track to hear. A track selector 166 is a processing component for receiving input of a track selection. For example, a first user can select a first track, a second user could select a second track, and so on. Thus, via the processor/filter 160 receives a track selection via the selector 166.

The processor/filter 160 therein processes the audio broadcast either from the receiver 164 or the storage 162, filtering out selected track. An audio processor 168 receives the extracted track, generating output via speakers 170. In this example, the speakers 170 may represent headphones wearable by the user. In another example, audio may be broadcast via external speakers, such as recording individual takes of a scene using multi-track puppetry described above.

Herein, a single audio broadcast can be distributed to multiple users. Via track selection and filtering, the processor 168 generates the audio output 170.

In one embodiment, if the storage device 162 includes a single track, the track selector 166 and filtering of the processor 160 may be excluded. For example, if separate audio tracks are broadcast and stored on different user devices, that user can have its intended track, avoiding needing to select a specific track and filter. In one embodiment, each user can separately receive his or her designated track, distributed from a central broadcast or distribution point, individually diverted to specifically designated users.

FIG. 12 illustrates a puppeteer 180 having an audio device 182 with headphone 184 and controlling the head 112 of the puppet 100 of FIG. 8. In this example, the puppeteer 180 may receive one or more tracks, such as track for the head itself and a track for the eyes. Or in another embodiment, the track may include different sounds/clicks associated with different movements, such as higher pitch clicks for moving the head and lower pitch clicks for moving the eyes.

As the puppeteer 180 listens to the audio track, these audio instructions allow for being translated back into movement choreography to generate the visual animation of the element 112.

While FIG. 12 shows a single puppeteer 180 with a single element 112, the present invention further allows multiple puppeteers to all operate in unison by listening to their own audio tracks. Thus, in the example of a puppet having 5 elements with 3 puppeteers, each puppeteer follows his or her own audio track. This results in a choreographed sequence of movements visually animating of the puppet.

In another embodiment, a single broadcast can be generally transmitted or played for all users, where the separate tracks are merged into this single track. In this embodiment, different audio instructions for specific users can be designated as tracks, but these tracks merged into a single audio broadcast. In this example, high pitch sounds can be instructions for a first user, middle pitch sounds are instructions for a second user, and low pitch sounds are instructions for a third user.

The present method and system further allows for element-specific image capture. For example, if video capture uses greenscreen technology, one embodiment can include filming a first take with a first element, as the head of the puppet, filming a second take with the torso and arms, filming a third take with the legs, etc. As the movements of the elements are synchronized due to the audio tracks, these movements can then be readily integrated in a post-processing environment, such as described above in FIG. 1-7.

In one embodiment, the audio device 182 can be a smartphone or other mobile device receiving a broadcast of the audio track. In this example, the device can be set to filter audio of one or more selected tracks, akin to a stereo receiver selecting a particular channel or station. This insures synchronization among puppeteers. In another embodiment, each user receives his or her designated track from a central distribution point.

Figure 13:
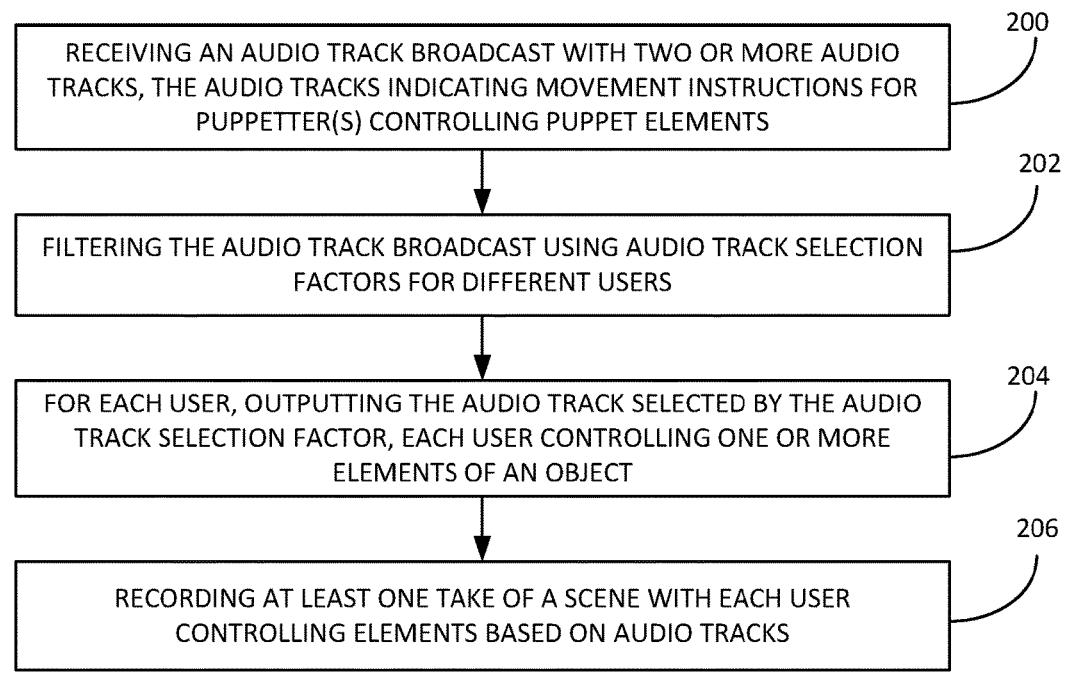
FIG. 13 illustrates steps of one embodiment of a method for generating take(s) of a scene using the audio broadcast.

FIG. 13 illustrates a flowchart of the steps of one embodiment of a method for synchronization of movements of an object having multiple elements. For example, the object may be a puppet and the elements may be limbs or associated components.

A first step, 200, is receiving an audio broadcast with two or more audio tracks. The audio tracks indicate movement instructions for puppeteers or other users controlling movement of the elements. Step 202 is, for each user having a designated audio track, filtering the audio broadcast using a selection factor. For example, as noted above, a first user can select a first track and a second user can select a second track, etc.

Step 204 is, for each user, outputting the audio track designated by the track selection factor. Each user controls one or more objects, the designated track relating to movement instructions for the associated objects. Step 206 in this embodiment is recording at least one take of a scene with the users controlling object movements based on the audio track. Recording the scene can include a single recording of one take with multiple users, where other techniques may include recording the scene in multiple takes and combining the takes using post-processing.

The present method may include varying embodiments, such as for example recording the scene using greenscreen technology. Another embodiment can use occluded or obscured users controlling the object movements. Another embodiment may include using both objects and tracking markers for multi-track techniques as described herein.

Figure 14:
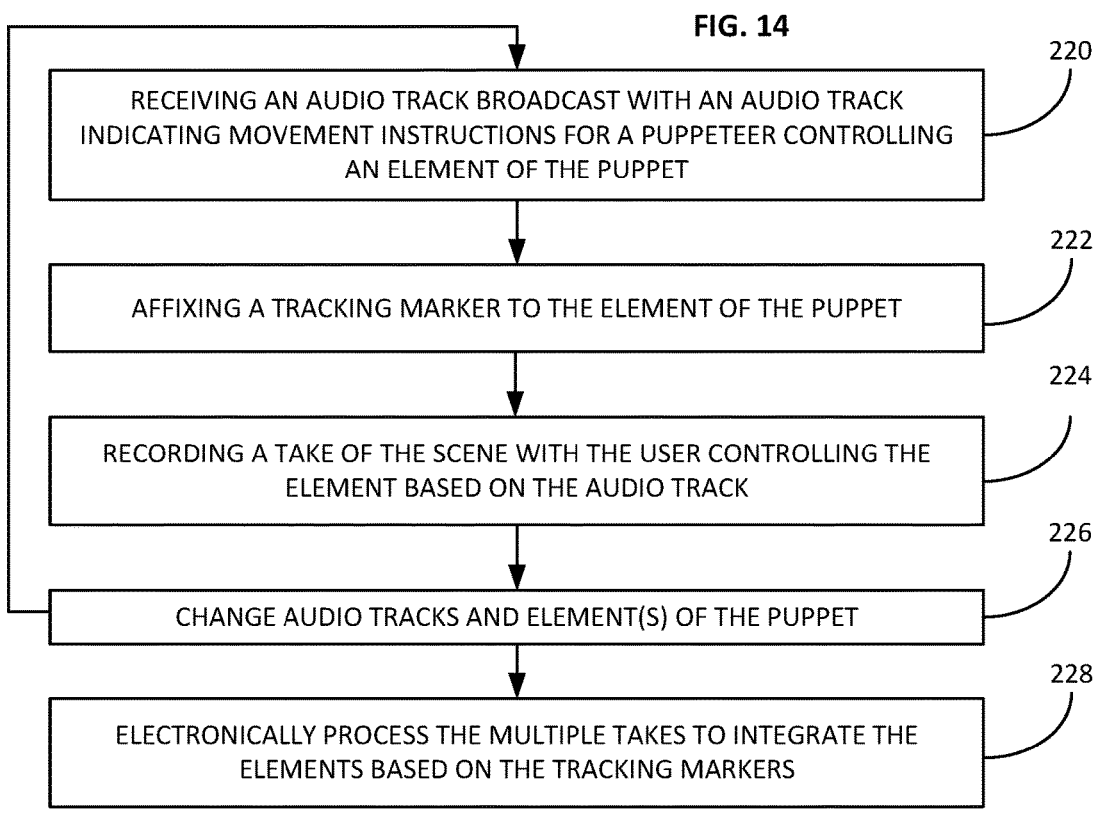
FIG. 14 illustrates steps of one embodiment of a method for generating a scene using multiple takes based on the tracking markers.

FIG. 14 illustrates another embodiment of a method for synchronization of movements of objects within a scene. This methodology includes step 220, receiving an audio broadcast with an audio track indicating movement instructions for puppeteers controlling elements of the puppet. As described above, the embodiment of a broadcast can include broadcasting an audio track to a receiver or may include broadcasting a start command for extracting audio tracks from local memory storage.

Step 222 is affixing a tracking marker to one or more of the elements of the puppet. Step 224 is recording a take of the scene with the user controlling the element based on the audio track. As described above, the audio track includes clicks or other sounds translated by the user (puppeteer) into movements of the objects, as the user hears the sounds he or she then moves the elements.

Upon capturing the scene, step 226 is to change the audio track(s) and element(s) of the puppet. Similar to the multi-track techniques described relative to FIGS. 1-7 above, a first take may be with the torso noted in FIG. 3 and a second take may be with the head of FIG. 4. Different movement instructions are noted in different tracks. Thus, the method reverts to step 220 for broadcasting the next track. In the embodiment with multiple takes, a broadcasted start signal may be superfluous as timing of a scene start can be controlled in a post-processing environment.

As capturing the second scene (step 224), the method iterates capturing all scenes for applicable elements. Thereafter, the method proceeds to step 228 for electronically processing the multiple takes, including integrating elements in the post-processing environment based on the tracking markers.

Figure 15:
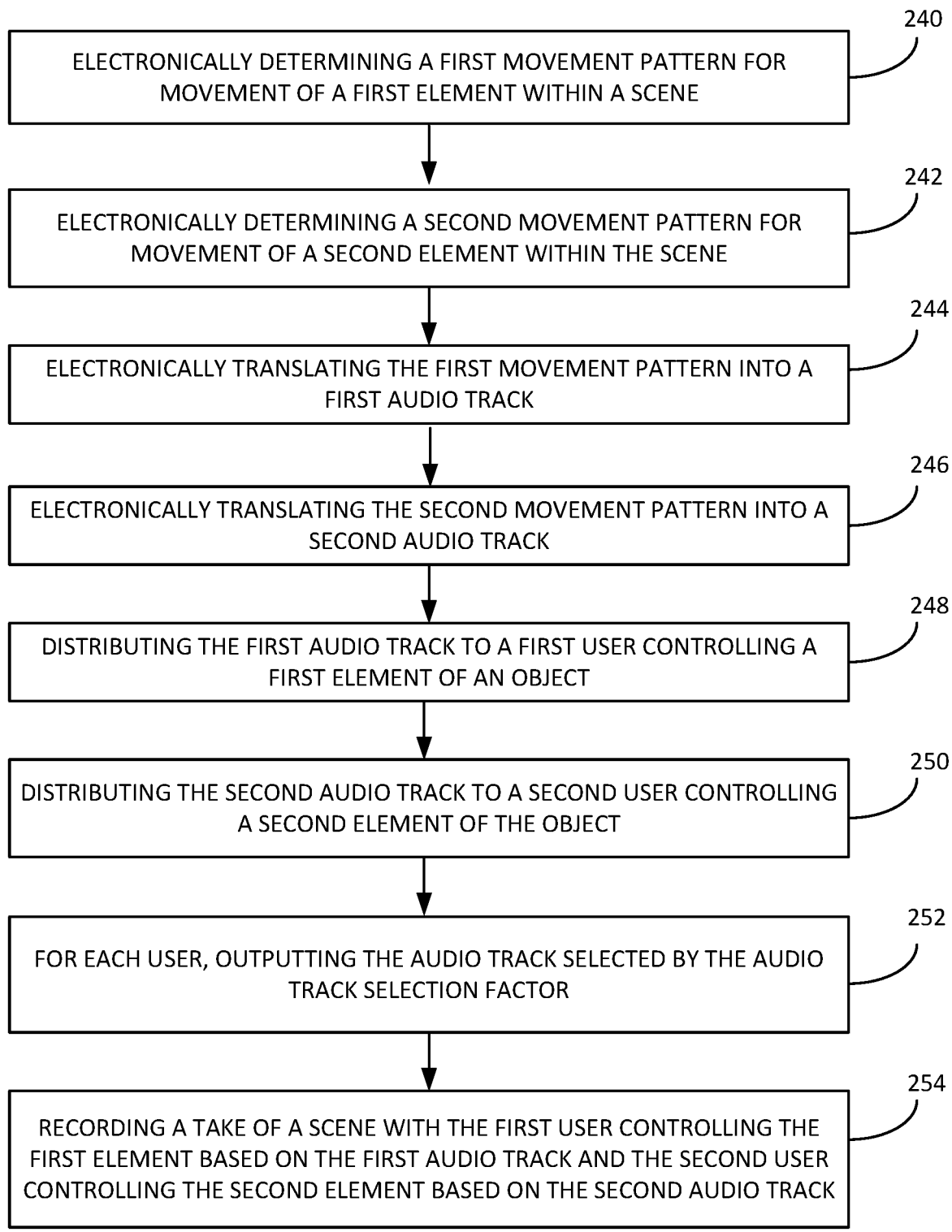
FIG. 15 illustrates steps of one embodiment of a method for generating a scene with multiple users controlling different elements of a puppet.

FIG. 15 illustrates a flowchart of another method for synchronization of movements of an object with multiple elements. Step 240 is electronically determining a first movement pattern for the movement of a first element within a scene. Step 242 is electronically determining a second movement pattern for a second element within the scene. For example, FIG. 9 describes processing elements for determining these movement patterns. Another embodiment can be manual user entry of designated motions and patterns of movements for objects, based on visual interpretation or estimation of movement patterns.

Step 244 is electronically translating the first movement pattern into a first audio track. Step 246 is electronically translating the second movement pattern into a second audio track. Again, FIG. 9 describes the audio translation module 126 and track generation module 128, which can be used to perform processing steps 244 and 246.

Step 248 is distributing the first audio track to a first user controlling a first element. Step 250 is distributing the second audio track to a second user controlling a second element. Distribution can be performed consistent with techniques described above.

Step 252 is outputting, for each user, an audio track determined by an audio track selection factor. Step 254 is recording a take of a scene with the first user controlling the first element based on the first audio track and the second user controlling the second element based on the second audio track.

Where multiple users are operating in synchronicity on different elements of the same object, headphones or other discrete audio devices can prohibit interference. For multiple takes of a scene with different elements, a loudspeaker or other external audio output can be used, where different users are not interfering with each other during these takes.

As used herein, any number of users and different tracks can be utilized. For example, using the above example of 5 objects being controlled by 3 puppeteers, two users may hear audio tracks blending instructions for 2 objects and a third user hears an audio track for a single element.

Additionally, the audio tracks can be ancillary or complimentary to the object elements. For example, a track may include instructions for external audio or visual elements. In the example of a walking, an audio element can be the sound of a footstrike or the sound of sliding of a shoe along the ground. Thus, one audio track may be external to the object elements themselves.

Capturing the choreography of movements, translating into a blueprint, and generating audio tracks allows for capturing element-specific movement instructions. Where each puppeteer individually listens to the audio tracks for movement instructions, the present method and system allows for synchronized movement made possible in hours of practice instead of years. Adding into multi-track puppetry techniques additionally allows for synchronization of multiple element movements in discrete scene-captures.

FIGS. 1 through 15 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A method for synchronization of movements of an object having a first element and a second element within a scene, the method comprising:
generating an audio broadcast including a first audio track including audible first movement instructions for user-generated movements of the first element of the object within the scene, the audio broadcast also including a second audio track including audible second movement instructions for user-generated movements of the second element of the object within the scene;
distributing the audio broadcast to a first user;
recording, via an image capture device, a take of the scene with the first user controlling the first element of the object via the user-generated movements based on the first audio track of the audio broadcast.

2. The method of claim 1 further comprising:
distributing the audio broadcast to a second user; and
recording, via the image capture device, the take of the scene with the second user controlling the second element based on the second audio track of the audio broadcast.

3. The method of claim 2, wherein the recording the take of the scene includes the first user controlling the first element of the object based on the first audio track being concurrent with the second user controlling the second element of the object based on the second audio track.

4. The method of claim 1 further comprising:
recording the take of the scene using a greenscreen background.

5. The method of claim 1 further comprising:
affixing a first tracking marker to the first element; and
recording the take of the scene capturing the first tracking marker therein.

6. The method of claim 5 further comprising:
electronically processing the take of the scene for integrating the first element with a puppet character based on the tracking marker.

7. A method for synchronization of movements of an object having a first element and a second element within a scene, the method comprising:
electronically determining, using a first processing device, a first movement pattern for movement of the first element within the scene;
electronically translating the first movement pattern into a first audio track, the first audio track including audible first movement instructions for user-generated movements of the first element of the object;
distributing the first audio track to a first user controlling the first element; and
recording, via an image capture device, a first take of the scene with the first user controlling the first element of the object via user-generated movements based on the audible first movement instructions within the first audio track.

8. The method of claim 7 further comprising:
electronically determining, using the first processing device, a second movement pattern for movement of the second element within the scene; and
electronically translating the second movement pattern into a second audio track, the second audio track including audible second movement instructions for user-generated movements of the second element of the object.

9. The method of claim 8 further comprising:
distributing the second audio track to a second user controlling the second element; and
recording, via the image capture device, a second take of the scene with the second user controller the second element based on the second audio track.

10. The method of claim 9, wherein the first element includes a first tracking marker and the second element includes a second tracking marker, wherein the object is a puppet character, the method comprising:

generating a single video recording of the scene with first element and the second element combined with the puppet character by electronically combining, using a processing device, the first element to the puppet character using the first tracking marker and the second element to the puppet character using the second tracking marker.

11. The method of claim 9 further comprising:
broadcasting the first audio track and the second audio track via an audio broadcast.

12. The method of claim 11, wherein broadcasting the audio broadcast includes:
transmitting the first audio track to the first user; and
transmitting the second audio track to the second user.

13. The method of claim 8 further comprising:
distributing the second audio track to a second user controlling the second element; and
recording, via the image capture device, the first take of the scene with the first user controlling the first element of the object via user-generated movements based on the audible first movement instructions within the first audio track concurrent with the second user controlling the second element based of the object via user-generated movements based on the audible second movement instructions within the second audio track.

14. The method of claim 7 further comprising:
recording the first take of the scene using a greenscreen background.

15. A method for synchronization of movements of an object having a first element and a second element within a scene, the method comprising:
electronically determining, using a first processing device, a first movement pattern for movement of the first element within the scene and a second movement pattern for movement of the second element within the scene;
generating a first audio track representing the first movement pattern of the first element and a second audio track representing the second movement pattern of the second element;
distributing an audio broadcast including the first audio track and the second audio track to a first user and a second user, the first user controlling movement of the first element and the second user controlling movement of the second element;
recording, via an image capture device, the scene including movement of the object with the first user controlling the first element based on the first audio track and the second user controlling movement of the second element based on the second audio track.

16. The method of claim 15, wherein distributing the audio broadcast including transmitting the audio track, the method further comprising:
transmitting the first audio track to only the first user.

17. The method of claim 15 further comprising:
transmitting the second audio track to only the second user.

18. The method of claim 15, wherein the first audio track includes a plurality of audible sounds representing movement instructions for the first user controlling the first element within the scene.

19. The method of claim 15 further comprising:
recording the scene using a greenscreen background, the first user and the second user encapsulated in greenscreen outfits.

20. The method of claim 15, wherein the audio broadcast includes the first track and second track simultaneously audible in a single audio output.

* * * * *